US009742776B2

(12) United States Patent
Lewis et al.

(10) Patent No.: US 9,742,776 B2
(45) Date of Patent: Aug. 22, 2017

(54) CONTACT IDENTIFICATION VALIDATION VIA SOCIAL INVITATION

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: GOOGLE INC., Mountain View, CA (US)

( * ) Notice: Subject to any disclaimer, the term of this patent is extended or adjusted under 35 U.S.C. 154(b) by 41 days.

(21) Appl. No.: 14/485,689

(22) Filed: Sep. 13, 2014

(65) Prior Publication Data

US 2016/0080385 A1    Mar. 17, 2016

(51) Int. Cl.
*G06F 21/62* (2013.01)
*H04L 29/06* (2006.01)

(52) U.S. Cl.
CPC .................. *H04L 63/101* (2013.01)

(58) Field of Classification Search
CPC .......................... H04L 63/101; G06F 17/30353
USPC ............................................................. 726/6
See application file for complete search history.

(56) References Cited

U.S. PATENT DOCUMENTS

| | | | | |
|---|---|---|---|---|
| 5,901,334 | A * | 5/1999 | Banks ...................... | G06F 9/505 710/56 |
| 8,584,258 | B2 | 11/2013 | La Rotonda et al. | |
| 9,202,207 | B2 * | 12/2015 | Dorsey ................... | G06Q 20/10 |
| 2002/0120757 | A1 | 8/2002 | Sutherland et al. | |
| 2006/0184997 | A1 * | 8/2006 | La Rotonda .......... | G06Q 10/10 726/2 |
| 2006/0253852 | A1 * | 11/2006 | Honda .................... | H04L 12/12 717/177 |
| 2007/0283403 | A1 | 12/2007 | Eklund et al. | |
| 2010/0005520 | A1 * | 1/2010 | Abbot ................ | G06Q 30/0255 726/6 |
| 2011/0219295 | A1 * | 9/2011 | Adams ..................... | G06F 17/00 715/234 |
| 2012/0010992 | A1 | 1/2012 | Gillin | |
| 2014/0143434 | A1 * | 5/2014 | Sanche ............... | H04L 65/1073 709/228 |
| 2014/0192143 | A1 * | 7/2014 | Walter ................... | H04N 7/152 348/14.08 |
| 2014/0223527 | A1 * | 8/2014 | Bortz ...................... | H04L 63/08 726/6 |

* cited by examiner

*Primary Examiner* — Amir Mehrmanesh
*Assistant Examiner* — Sakinah Taylor
(74) *Attorney, Agent, or Firm* — Morris & Kamlay LLP

(57) ABSTRACT

Systems and techniques are disclosed for receiving one or more recipient identifiers and a destination location from a user or an application. A uniform resource locator may be generated and may include a destination ID corresponding to the destination location. An entry containing the one or more recipient identifiers may be generated in an access control list for the destination location. A recipient may request access to the destination location by selecting the uniform resource locator. A recipient identifier may be determined for the recipient requesting the access and may be compared to entries in the access control list. If the recipient identifier matches an entry in the access control list, then the recipient may be granted access to the destination location.

17 Claims, 3 Drawing Sheets

CONTACT IDENTIFICATION VALIDATION VIA SOCIAL INVITATION

BACKGROUND

Sharing applications, services or any other type of content among users is a way to increase traffic to a platform. Traditionally, once a user receives an invitation to join an application, service, or platform, there are several steps that may be required prior to the user gaining the requested access. As an example, first the user may need to sign in with the service. Subsequently, a verification notification may be sent to a phone number or email address provided during the initial sign-in with a verification code. The user may then need to leave the platform, find the notification, and utilize the notification to verify her account. The requested access may only be provided at the conclusion of these steps.

BRIEF SUMMARY

According to embodiments of the disclosed subject matter, identification of one or more recipients may be received along with a destination location. The recipient identifier may be a phone number, email address, or other unique identifier. The destination location may correspond to a conversation, a media page, a media collection, a webpage, or the like. A uniform resource locator may be generated and may contain a destination ID based on the destination location. A determination may be made that a first recipient of the one or more recipients is an un-enrolled recipient. Accordingly, an entry corresponding to the first recipient may be made in an access control list. An access request may be received based on a first user selection of the uniform resource locator via a user device. The first user's recipient identifier may be determined and may be matched against entries in the access control list. If the first user's recipient identifier matches an entry in the access control list, then the first user may be granted access to the destination location.

According to embodiments of the disclosed subject matter, means are provided to receive one or more recipient identifiers. The recipient identifier may be a phone number, email address, or other unique identifier. The destination location may correspond to a conversation, a media page, a media collection, a webpage, or the like. Further, means are provided for generating a uniform resource locator that may contain a destination ID based on the destination location. Means for determining that a first recipient of the one or more recipients is an un-enrolled recipient may be provided. Accordingly, an entry corresponding to the first recipient may be made in an access control list. An access request may be received based on a first user selection of the uniform resource locator via a user device. The first user's recipient identifier may be determined and may be matched against entries in the access control list. If the first user's recipient identifier matches an entry in the access control list, then means for granting the first user access to the destination location may be provided.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
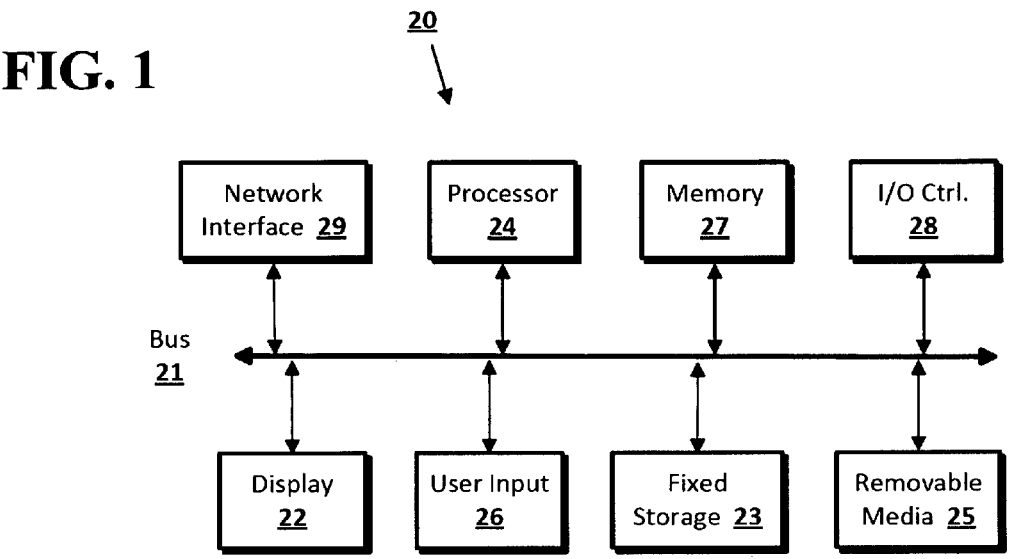
FIG. 1 shows a computer according to an embodiment of the disclosed subject matter.

According to the techniques disclosed herein, a user may enable a recipient to gain access to a destination location (e.g., a chat room, a video channel) such that, for example, the user and the recipient are granted access to the destination location. The techniques disclosed herein enable the recipient to gain the access to the destination location with minimal time and effort on the part of the recipient and the user. As a specific example, the techniques disclosed herein may enable authentication of a recipient without requiring the recipient to input a code (e.g., a code sent to the recipient via an SMS message) or require a service (e.g., an application) to read the recipient's notifications (e.g., SMS messages, emails, etc.).

A user may have access to a destination location via an application, webpage, online community or the like, ("application"). The destination location may be a conversation (e.g., a messaging based conversation, a group chat, a video chat, a thread, a forum, etc.), a media page (e.g., a video page, an image page, an audio page, a text page, etc.), a media collection (e.g., a group of media content such as video content, audio content, image content, text content, a combination thereof, or the like). As an example, a user may be part of or initiate a group chat via a chat application. The user may opt to add one or more recipient users to the destination location. Continuing the example, the user that initiates a group chat via the chat application may intend to add a recipient A and a recipient B to the group chat. The user may select recipient A and recipient B by selecting recipient identifiers (e.g., phone numbers) via the application or external to the application (e.g., via the user's contacts). A backend server may receive the request from the user to add one or more recipient users to the destination location. Here, the backend server may receive the recipient identifiers for the intended recipients. The backend server may generate a uniform resource locator ("URL") that contains a destination ID for the destination location. The backend server may also determine whether the intended recipients are enrolled or un-enrolled, as disclosed herein. If a recipient is an enrolled recipient (e.g., the user already has an account with the application), then the enrolled recipient may receive a notification via the application that directs the enrolled recipient to the destination location via the recipient's version of the application. If the recipient is an un-enrolled recipient, then the recipient identifier associated with the recipient may be stored in an access control list.

Additionally, the intended recipient may be provided with a communication containing the URL via any applicable communication technique, such as an SMS message. The recipient may opt to select the URL and the backend server may receive an access request as a result of the recipient selecting the URL. The backend server may determine one or more recipient identifiers associated with the request. The one or more determined recipient identifiers may be compared with the entries in the access control list. If a recipient identifier associated with the request (e.g., the requesting recipient's phone number), then the recipient may be granted access to the destination location.

According to implementations of the disclosed subject matter, an enrolled recipient may be a recipient that has access to or has an account associated with the destination location associated service. As an example, a destination location may be a chat room in a chat service (e.g., a chat application). Here, an enrolled recipient may be a recipient that has an account with the chat application. An un-enrolled recipient may be a recipient that does not have access to or does not have an account associated with the service associated with the destination location. As another example, a destination location may be a video channel via webpage. Here, an un-enrolled recipient may be a recipient that does not have an account with the webpage and, thus, cannot access video channels via the webpage.

According to implementations of the disclosed subject matter, a destination location may correspond to any electronic location accessible by a user device such as a conversation (e.g., a messaging based conversation, a group chat, a video chat, a thread, a forum, etc.), a media page (e.g., a video page, an image page, an audio page, a text page, etc.), a media collection (e.g., a group of media content such as video content, audio content, image content, text content, a combination thereof, or the like). Example destination locations include chat rooms, group conversations, video channels, audio channels, image collections, text page, webpage, or the like.

According to implementations of the disclosed subject matter, a recipient identifier may be any identifier that identifies a recipient or a recipient device such as a phone number, email address, unique identifier, account ID, username, or the like. As an example, a recipient identifier may be an account ID that identifies one or more of the recipient's accounts.

According to implementations of the disclosed subject matter, a URL may be a web link, an application link, a service link, or the like. A URL may contain or point to one or more data or locations and may be encrypted. Notably, a URL may include but need not be limited to a link to a webpage on the world wide web.

Figure 3:
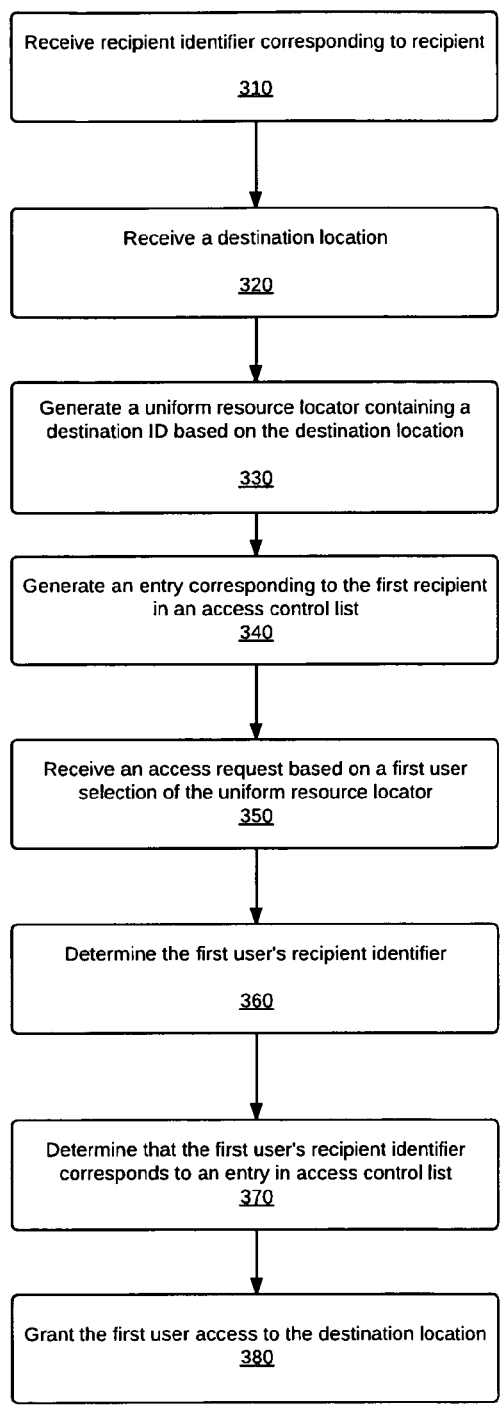
FIG. 3 shows an example process for granting a user access to a destination location, according to an example of the disclosed subject matter.

According to implementations of the disclosed subject matter, as shown in FIG. 3 at step 310 a backend server or service server may receive one or more recipient identifiers. The recipient identifiers may correspond to recipient information such as a phone numbers, email addresses, unique IDs, or any identifier that identifies a recipient. The recipient identifiers may be received as a result of a user selecting one or more recipients that the user intends to invite to participate in or access a destination location. The user may identify recipients directly via a destination location associated service such as an application (e.g., a chat application), an account (e.g., a video channel that contains videos uploaded by a user), a webpage, or the like. As an example, a webpage that is used to access a video channel may contain an area where a user can input recipient information (e.g., name, phone number, email, etc.). A user may provide the recipient information and the service or a backend server may receive this information. Alternatively, a user may identify recipients via any other manner such as via a user device's embedded contact list, an external contact list, or the like. As an example, a destination location associated service may direct a user to the user's embedded contact list and the user may select or import the contacts as recipients via the contact list.

According to implementations of the disclosed subject matter, as shown at step 320, the backend server or service may receive a destination location. As disclosed herein, a destination location may be any applicable electronic location that is accessible via user devices such as a conversation, a media page, a media collection, or the like. A backend server or service may receive the destination location based on the user providing the recipients via the destination location (e.g., directly from a chat room to which the user intends to invite recipients). Alternatively, a backend server may receive the destination location from a user submission of the recipients as well as the destination location to the backend server (e.g., by a user bundling the two and transmitting them to the backend server via the service).

According to implementations of the disclosed subject matter, as shown at step 330, the backend server or service may generate a URL that contains or directs to a destination ID. The destination ID may be an identifier that points to or otherwise identifies a destination location. As an example, a destination ID may point to a video channel or a chat room to which a user intends to invite recipients. The destination ID may be, for example, a unique identifier of the destination location that is stored in a database or otherwise associated with an individual electronic resource. For example, a service that provides multiple video channels to users may maintain a list of available channels, each of which is identified by an identifier, which then may be used as the destination ID for that video channel.

According to implementations of the disclosed subject matter, as shown at step 340, an entry corresponding to a recipient may be generated in an access control list. The access control list may be a list that contains recipient identifiers that indicate those recipients that are allowed to have access to a destination location. As an example, a user may add recipient A as a recipient that the user intends to invite to a group chat. The backend server may add recipient A's phone number to an access control list for the group chat. The list may contain other recipient identifiers such as, for example, the user's own identifier as the user has access to the group chat.

According to an implementation of the disclosed subject matter, a timestamp may be associated with an entry in an access control list. The timestamp may correspond to a time that a user requests a recipient to be invited to a destination location. As an example, if a user B selects a recipient C to be added to a video channel, the timestamp may correspond to the time that user B selected recipient C. As disclosed herein, a recipient may be granted access to the destination location. However, a recipient that may otherwise be granted to the destination location, in accordance with the techniques disclosed herein, may not gain access if the time that the recipient requests the access is a threshold amount greater than the timestamp.

According to implementations of the disclosed subject matter, a recipient may receive a notification with the URL containing the destination ID. The notification may have any applicable communication format such as an SMS, e-mail, an in-application message, a social media message, or the like. The notification may be based on the recipient information provided by a user that requested the recipient to have access to the destination location. As an example, if a user selects a recipient for access to a destination location by selecting the recipient's phone number from her contact list, then the recipient may receive the notification via an SMS message sent to that phone number. As another example, if a user selects a recipient for access to a destination location by selecting the recipient's e-mail address, then the recipient may receive the notification via an e-mail sent to that email address. It should be noted that the notification may be sent via multiple formats (e.g., SMS message and e-mail) based on the available recipient information.

A recipient may request access to a destination location by selecting a URL that the recipient receives via a notification. The selection may be a verbal selection, tactile or touch selection, automatic selection, or the like. As an example, a recipient may select a URL by clicking on the URL using a mobile device. As another example, a recipient device or service may automatically be set to select a URL via a notification.

According to implementations of the disclosed subject matter, as shown at step 350, a backend server or service may receive an access request based on a recipient selection of a URL, as shown in step 340. The access request may contain the location ID associated with the URL that was selected to trigger the access request.

According to an implementation of the disclosed subject matter, as shown at step 360, a recipient identifier may be determined for the recipient who submits the access request. The recipient identifier may be determined based on whether the recipient is an enrolled recipient or an un-enrolled recipient. As disclosed herein, an enrolled recipient may be one that has access to, or owns or controls, an account associated with the destination location associated service. As an example, a recipient may select a URL that is associated with access to a chat room via a chat application. If the recipient is already a member of the chat application, then the recipient would be designated an enrolled recipient. If the recipient is not a member of the chat application, then the recipient may be designated as an un-enrolled recipient.

According to implementations of the disclosed subject matter, recipient identifiers for recipients requesting access via a URL may be determined only if the recipient is an enrolled recipient. Accordingly, if an un-enrolled recipient requests access via the URL, the destination location associated service (e.g., the application that would provide the access) may request that the recipient become an enrolled recipient (e.g., by signing up with the service, by opening an account, by downloading an application, etc.). The enrollment process may include steps that require the recipient to provide information such as recipient identifiers (e.g., a phone number, an email, an account identifier, or the like). As an example, a recipient A may receive a URL associated with a chat room V. The recipient A may select the URL and be directed to a page that requests the recipient to download the application that enables communication via chat room V. Accordingly, the recipient may download the application and become a member of the application by providing information such as the recipient's phone number.

According to implementations of the disclosed subject matter, as shown at step 370 in FIG. 3, a backend server or service may compare one or more of the access requesting recipient's recipient identifier (e.g., phone number) with entries in the access control list of step 340. The requesting recipient's recipient identifier may be extracted based on the information associated with the recipient during the recipient's enrollment process. If the requesting recipient's recipient identifier matches an entry in the access control list of step 340, then the requesting recipient may be granted access to the destination location, as shown at step 380. Continuing the pervious example, recipient A may sign up to become a member of the chat application and provide her phone number to do so. Subsequently, the recipient A's phone number may be compared with a list of phone numbers in the access control list associated with the chat room to which the URL corresponds. If the phone number matches with an entry, then recipient A may be granted access to the chat room. Notably, an enrolled recipient may gain requested access to a destination location without verifying a code and without the backend server or service gathering information for the recipient's notifications and/or personal data.

Figure 4:
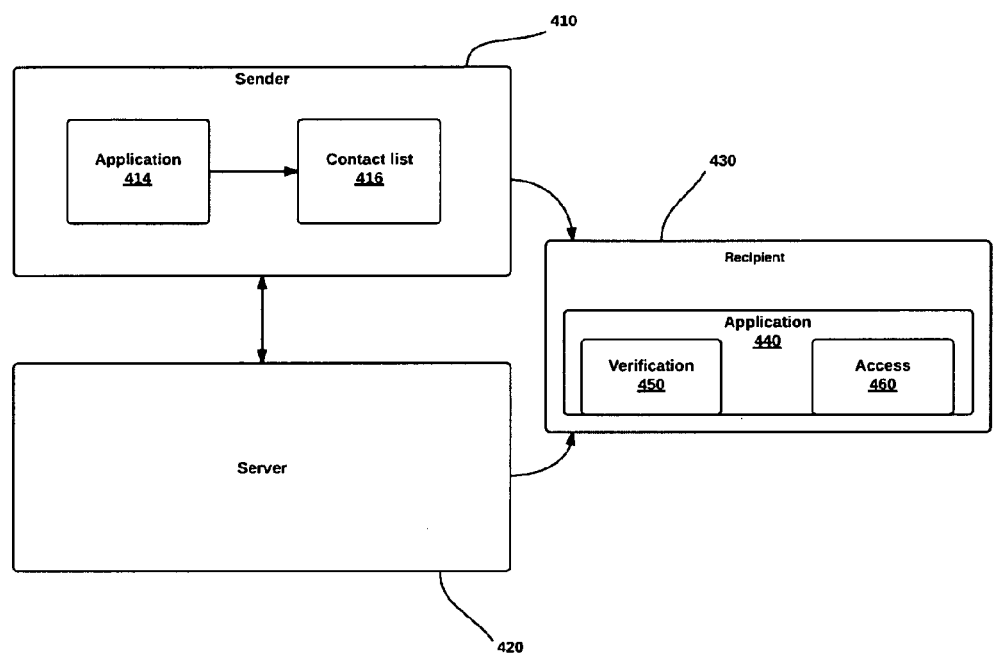
FIG. 4 shows another example process for granting a user access to a destination location, according to an example of the disclosed subject matter.

As an illustrative example of the disclosed subject matter, as shown in FIG. 4, a sender (i.e., a user) may request access to a destination location for a recipient. As shown, the sender process 410 may include the sender accessing an application 414 within which the sender intends to request access for a recipient. As a specific example, a sender may access a video sharing application and access a video channel (e.g., a set of videos). The sender may intend to request that a recipient gain access to the video channel. A sender may request the access for one or more recipients by selecting the one or more recipients from the sender's contact list 416. The video channel ID (i.e., destination ID) and the recipient identifiers associated with the selected recipients may be provided to a server 420. The server 420 may generate a URL that contains at least the video channel ID. Additionally, the server 420 may add the recipient identifiers to an access control list associated with the video channel. According to a first implementation, for example, the server may provide the URL to the sender and the sender 410 or the application 414 may transmit the URL to the one or more recipients. According to a second implementation, for example, the server may directly transmit the URL to the one or more recipients 430. The recipient may select the URL and an application instance 440 (corresponding to the application 414) may activate. The application instance 440 or server 420 may verify that the recipient identifier stored in accordance with the recipient's application account (e.g., the recipient's phone number) matches an entry in the video channel's access list. If the recipient identifier matches an entry in the video channel's access list, then the recipient may be granted access to the video channel at 460.

Implementations of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
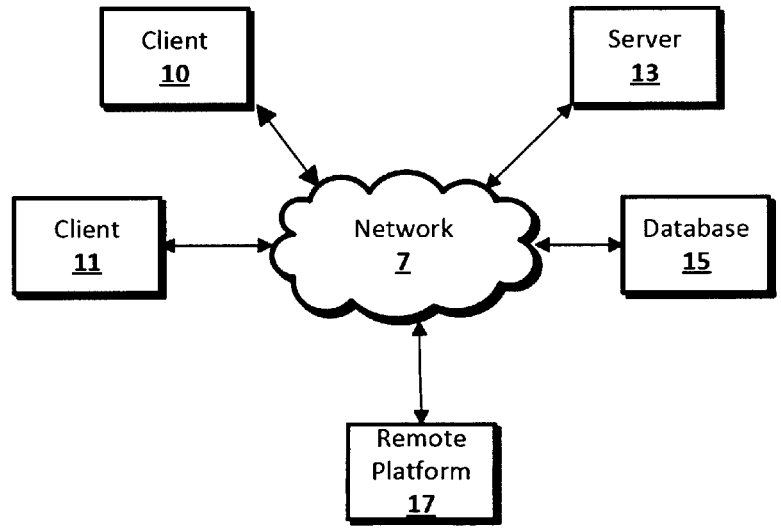
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    receiving one or more recipient identifiers corresponding to one or more recipients, wherein the one or more recipients are identified directly via a destination location associated service that includes a messaging application, and wherein the one or more recipients are authenticated without requiring the one or more recipients to input a code or require the service to read the one or more recipient's notifications;
    receiving the destination location;
    generating a uniform resource locator comprising a destination identifier based on the destination location;
    generating an entry corresponding to a first recipient, of the one or more recipients, in an access control list for the destination location;
    receiving an access request based on a selection of the uniform resource locator by a second recipient;
    determining a second recipient identifier by receiving an enrollment request to enroll in the destination location associated service, and receiving the first recipient identifier based on the enrollment;
    determining that the second recipient identifier corresponds to the entry corresponding to the first recipient in the access control list;

determining that the second recipient is an un-enrolled recipient by determining that the first recipient is not a member of the destination location associated service; and granting the second recipient access to the destination location.

2. The method of claim 1, wherein a recipient identifier is selected from the group consisting of: a phone number, an email address, and a unique identifier.

3. The method of claim 1, wherein the destination location is one selected from the group consisting of: a conversation, a media page, a media collection, and a webpage.

4. The method of claim 1, wherein the uniform resource locator further comprises one or more selected from the group consisting of: pointers to multiple data points, encrypted data, a webpage location, and an application page location.

5. The method of claim 1, further comprising transmitting the uniform resource locator to the first recipient via one selected from the group consisting of: an email and an SMS message.

6. The method of claim 5, wherein the transmission is sent by one selected from the group consisting of: a user device, an application, and a backend server.

7. The method of claim 1, wherein the entry corresponding to the first recipient in an access control list comprises a timestamp.

8. The method of claim 7, further comprising:

determining that the current time associated with the access request is within a threshold time of the timestamp; and granting the first recipient access based on determining that the current time associated with the access request is within a threshold time of the timestamp.

9. The method of claim 1, further comprising:

associating a timestamp with an entry in an access control list, wherein the timestamp corresponds to a time that the first recipient is invited to the destination location; and granting or denying access to the destination location based on whether the time that the first recipient requests the access is a threshold amount greater than the timestamp.

10. A system comprising:

a hardware processor configured to:

receive one or more recipient identifiers corresponding to one or more recipients, wherein the one or more recipients are identified directly via a destination location associated service that includes a messaging application and wherein the one or more recipients are authenticated without requiring the one or more recipients to input a code or require the service to read the one or more recipient's notifications;

receive the destination location;

generate a uniform resource locator comprising a destination identifier based on the destination location;

generate an entry corresponding to a first recipient, of the one or more recipients, in an access control list for the destination location;

receive an access request based on selection of the uniform resource locator by a second recipient;

determine a second recipient identifier by receiving an enrollment request to enroll in the destination location associated service, and receiving the first recipient identifier based on the enrollment;

determine that the second recipient identifier corresponds to the entry corresponding to the first recipient in the access control list;

determine that the second recipient is an un-enrolled recipient by determining that the first recipient is not a member of the destination location associated service; and grant the second recipient access to the destination location.

11. The system of claim 10, wherein a recipient identifier is selected from the group consisting of: a phone number, an email address, and a unique identifier.

12. The system of claim 10, wherein the destination location is one selected from the group consisting of: a conversation, a media page, a media collection, and a webpage.

13. The system of claim 10, wherein the uniform resource locator further comprises one or more selected from the group consisting of: pointers to multiple data points, encrypted data, a webpage location, and an application page location.

14. The system of claim 10, further comprising transmitting the uniform resource locator to the first recipient via one selected from the group consisting of: an email and an SMS message.

15. The system of claim 14, wherein the transmission is sent by one selected from the group consisting of: a user device, an application, and a backend server.

16. The system of claim 10, wherein the entry corresponding to the first recipient in an access control list comprises a timestamp.

17. The system of claim 16, further comprising:

determining that the current time associated with the access request is within a threshold time of the timestamp; and granting the second recipient access based on determining that the current time associated with the access request is within a threshold time of the timestamp.

* * * * *